United States Patent [19]
Gazda, Jr.

[11] Patent Number: 5,943,341
[45] Date of Patent: Aug. 24, 1999

[54] TOKEN RING ADAPTER INTERFACE

[75] Inventor: Richard P. Gazda, Jr., Upton, Mass.

[73] Assignee: 3Com Corporation, Santa Clara, Calif.

[21] Appl. No.: 08/726,166

[22] Filed: Oct. 4, 1996

[51] Int. Cl.⁶ .................................................. H04J 3/00
[52] U.S. Cl. .......................................... 370/452; 370/403
[58] Field of Search ............................ 370/452, 401,
370/403, 404, 406, 407, 449, 451, 450,
455, 460, 442, 458, 462, 463, 465, 480,
503, 508, 509, 512, 518, 520, 522, 402,
405, 410

[56] References Cited

U.S. PATENT DOCUMENTS 5,379,292  1/1995  Kurata et al. ............................ 370/405
5,734,824  3/1998  Choi ........................................ 370/405

*Primary Examiner*—Dang Ton
*Attorney, Agent, or Firm*—McGlew and Tuttle, P.C.

[57] ABSTRACT

A computer local area network using the IEEE Token Ring Standard and Token Ring Adapters for connection to the physical layer and the backplane. The physical layer device and the MAC Device in the present invention are manufactured by different companies and belong to different chip sets. The MAC Device and the physical layer device are not designed to work with each other, and will not directly interface with each other. The present invention uses a programmable array logic (PAO) to modify signals between the physical layer device and the MAC Device so that proper operation can occur, especially with regard to the detection of valid data after frequency acquisition.

11 Claims, 9 Drawing Sheets

| Packet Size | PRESENT INVENTION | | | Cisco 4500/PRIOR ART | | |
|---|---|---|---|---|---|---|
| | Thruput | % Loss | Latency (us) | Packet Size | % Loss | Latency |
| 52 | 3122 | <1 | 142 | >3903 | 30 | 238 |
| 64 | 6379 | 0 | 44 | >3903 | 25 | 204 |
| 256 | 4462 | 0 | 783 | >2603 | 31 | 323 |
| 512 | 2602 | 0 | 241 | >1952 | 34 | 440 |
| 1024 | 1819 | 0 | 594 | >1301 | 22 | 825 |
| 1518 | 1255 | 0 | 578 | >1041 | 15 | 956 |
| 2048 | 941 | 0 | 424 | 84 | 13 | 769 |
| 3960 | 496 | 0 | 764 | 459 | 6 | 1571 |

Figure 9

TOKEN RING ADAPTER INTERFACE

FIELD OF THE INVENTION

The present invention relates to Local Area Networks (LANs) in general and more particularly to LAN systems with a plurality of computers with communication between the computers using the IEEE Token Ring Standard for Network Performance and Operation.

BACKGROUND OF THE INVENTION

The IEEE standard for token ring data communication provides for the timing of signals and takes in account worse case scenarios of all physical layer conditions. IEEE Standard 802.5 "Token Ring Access Method and Physical Layer Specification" is particularly relevant. The physical layer conditions include all the possible conditions of the connection from the back of a work station to the network cable, travel of the signals over the cable, connection of the cable to a module in a concentrator, the electrical connection between the module and the backplane in a concentrator, and the subsequent electrical connections from the backplane to another module, to another cable and to another work station. A token ring adapter is used at the connections to the ends of the network cable and at the connections to the backplane. Each of the token ring adapters have a physical layer device and a MAC device. The physical layer device handles the physical layer of the token ring standard and the MAC device handles the data link layer of the standard. These two layers of the token ring standard are adjacent to each other and are very related. The IEEE standard is somewhat loose with regard to separating functions between the physical layer and in the data link layer.

Therefore electronic integrated circuit (IC) manufacturers often make a pair of integrated circuits, known as a "chip set" for handling the physical and data link layers of the token ring standard. The physical layer device IC and the data link or MAC device IC of a chip set are designed to compliment each other and to work together as a single unit to take care of all the functions and signals of the physical and data link layer of the IEEE token ring standard.

In order for a chip set to be widely used, the manufacturer of a chip set will design the chip set to conform to all the IEEE requirements, to be used in all parts of a LAN and to design the chip set to operate in worse case scenarios.

While this may be advantageous for sales of a chip set, it is often disadvantageous in situations where all the functions and safeguards are not needed. These extra functions and safeguards lower the performance in situations where the worse case scenarios will not be encountered. However, designing a chip set for only the circumstances of a particular situation is often uneconomical due to the high cost of designing a completely new chip set and the low number of situations needing that particular chip set. Therefore designers of LANs must make a compromise between using standard chip sets and foregoing any possible increases in performance, or investing a great deal of time and money in designing a chip set to take advantage of the particular circumstances of a particular situation. The advantages are usually not great enough to justify the expense.

SUMMARY AND OBJECTS OF THE INVENTION

It is an object of the present invention to improve the performance of a token ring adapter in particular situations, without having to redesign a completely new chip set for the particular situations.

It is another object of the invention to use a physical layer device from an IBM chip set and a Media Access Control (MAC) device from a Texas Instruments chip set which have not been designed to cooperate with each other.

According to the invention, a Programmable Array Logic (PAL) device is electrically inserted in between the IBM physical layer device and the TI MAC device. The PAL device receives signals from the IBM physical layer device and the TI MAC device as inputs. The PAL device then combines these input signals into output signals and sends these output signals to the TI MAC device so that the TI MAC device and the IBM physical layer device can not only properly operate, but improve performance.

Using the physical layer device from an IBM chip set and the MAC layer device from a Texas Instruments chip set is problematic as the TI MAC device is not designed to work with the IBM physical layer device. However, the corresponding chips of these chip sets perform many of the same functions and use many of the same signals. Therefore, many of the signals generated and received by the IBM physical layer device can directly interface with many of the corresponding signals of the TI MAC device. Many of the signals on the IBM physical layer device can be directly connected to the corresponding signals of the TI MAC device.

Several signals however do not directly interface between the IBM physical layer device and the TI MAC device. In particular, these signals which do not directly interface, relate to the energy detection circuit of the TI chip set and the Elastic Store Buffer of the IBM chip set.

The two signals of most interest in the connection between the IBM physical layer device the TI MAC device are the FRAQ and REDY signals. The FRAQ to REDY timing is also important in the present invention. The energy detect circuit provides a timing delay on the REDY signal. When the FRAQ terminal changes state, it indicates to the energy-detect circuit that a change of lock mode has occurred and that time must be allowed before data recovered from the normally present TI physical layer device can be considered valid. The energy detect timing capacitor is discharged shortly after a low or high going transition of FRAQ, which results in the REDY signal being deserted.

The time taken for the normally present TI physical layer device to acquire phase lock depends on the transition density of the incoming data, so the delay of the energy-detect circuit also changes. Each rising transition of data results in a current pulse of fixed duration being injected into the energy-timing capacitor. The charge time of the capacitor is dependent on the incoming data transition density and REDY is reasserted after the capacitor reaches an internally set threshold voltage.

A small discharge current is always present on the energy timing capacitor. When the incoming data transition density falls below a certain threshold, the current pulses may not be sufficient to overcome this discharge current and REDY many not be asserted.

When the REDY signal is asserted to the TI MAC device, data is received or sent normally. When the signal is deasserted, data is ignored by the TI MAC device. The interaction of the FRAQ and REDY signals determine the ability of the MAC to process the incoming data. Further, these signals directly affect the throughput of the MAC and hence the performance of the network interface.

As explained previously, the TI MAC device and the IBM physical layer device are not a matched chip set. Therefore, in order for the TI MAC device to operate properly, the IBM physical layer device needed to be augmented to emulate the operation of the TI physical layer device with respect to the interface signals, especially those relating to the energy-detect circuit. Since the IBM physical layer device and the TI physical layer device are part of a common token architecture, they share many of the same signals and functions. However the signals and functions are implemented differently. Further, since the IBM physical layer device is targeted for a backplane interface, the concept of a wire fault, signal WFLT does not really apply.

The IBM physical layer device is configurable into many different known modes and the present invention uses the IBM physical layer device configured in the Daughter Card Mode of operation. The IBM physical layer device does not have a REDY signal. This is due to the nature of the interface between the IBM physical layer device and the backplane. Since the REDY signal indicates to the TI MAC device when to accept valid data from the interfacing device, it is required that the present invention emulate the signal for the TI MAC device to process the data correctly. The IBM physical layer device contains an Elastic Store Buffer which is used in the present invention to compensate for the Energy Detect Circuit which would have been present in the normally present TI physical layer device.

The Elastic Store Buffer stores the incoming data from the backplane using a zero-to-sixteen (0–16) bit deep buffer. The number of bits used by the Elastic Store depends on the chips mode of operation. The Elastic Store is used to coordinate the transfer of data from the back to the TI MAC device so as to correct for bit density fluctuations and for clocking of the data from the IBM physical layer device to the TI MAC device. This action eliminates the need for a REDY signal from the IBM physical layer device to the TI MAC device. However since the TI MAC device requires the REDY signal for valid data transfer, the PAL device was developed to emulate this function to the TI MAC device.

Because the IBM physical layer device automatically accounts for the energy detect circuit function in the normally present TI physical layer device, the timing relationships which are allowed between the TI MAC device and physical layer device, could be operated at the minimum time specification for all data transfers. Therefore the present invention provides for an improved performance for particular situations without having to create a custom chip set for the particular situations.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 9 is a chart of performance data for the present invention versus the prior art device Cisco 4500 Box Product for the TR Bridging using the W&G tester.

DETAILED DESCRIPTION OF THE PREFERRED EMBODIMENTS

Figure 1:
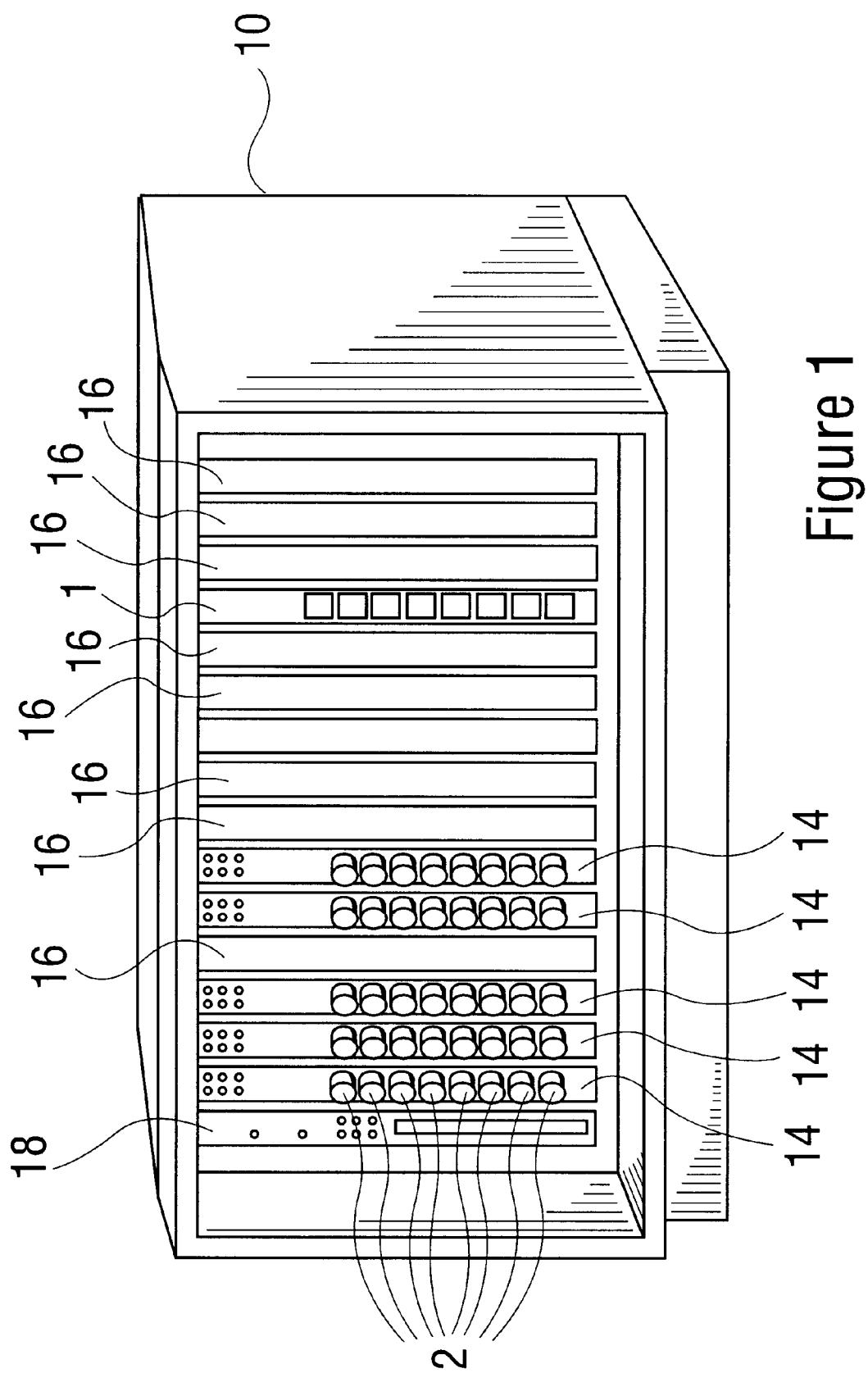
FIG. 1 is a concentrator with a plurality of slots and media modules.
Figure 2:
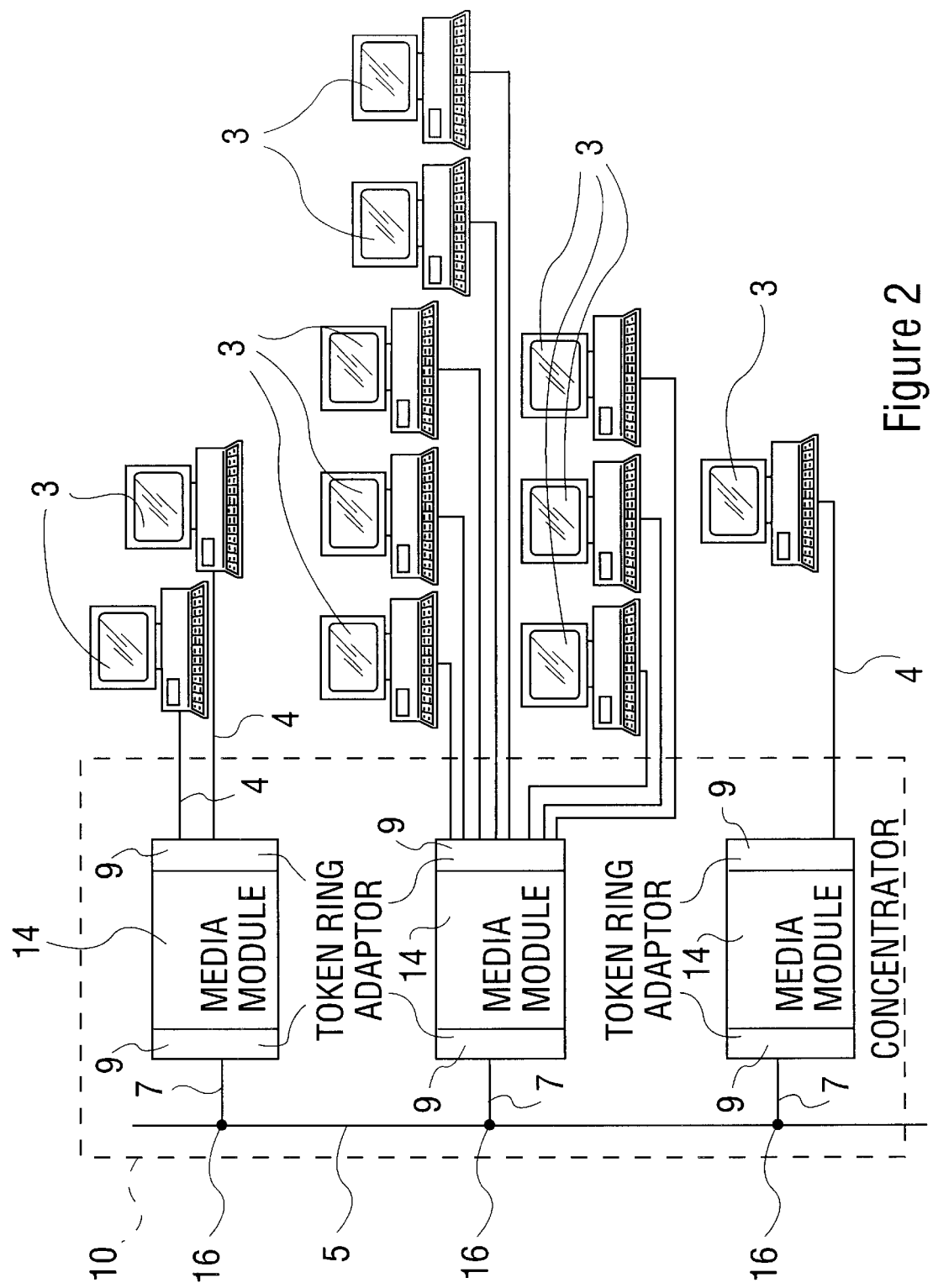
FIG. 2 is a schematic diagram of a plurality of workstations connected to media modules connected to a backplane.

Referring to the drawings, in particular to FIG. 1, a concentrator 10 contains a plurality of media modules 14 and a plurality of empty slots 16 which can be filled with media modules 14 or other modules. Each of the media modules 14 has a plurality of ports 2. As shown in FIG. 2, a plurality of stations 3 can be connected over cables 4 to the ports of media modules 14. The concentrator 10 has a backplane bus 5, of which a portion is shown in FIG. 2. The backplane bus 5 connects the modules 14 to form a network such as a token ring network. It is also possible to connect a plurality of concentrators to serve more users and to provide more than one network over the backplane of one concentrator. Two or more networks can be connected through bridge modules or router modules 1. In this way, the modules on several different concentrators can be connected to form a single network or users from different networks can be connected. Each of the media modules 14 can have a plug or tab 7 which plugs into one of the slots 16 of the backplane 5, as shown in FIG. 2. In this way, all the media modules 14 can communicate with each other. Other modules such as power modules, management modules and/or control modules can be plugged in the slots 16.

Each of the media modules 14 has a token ring adapter 9 for connecting the media module to the backplane 5. The media modules 14 also contain token ring adapters 9 for connecting the media module to each of the cables that lead to a work station 3.

Figure 3:
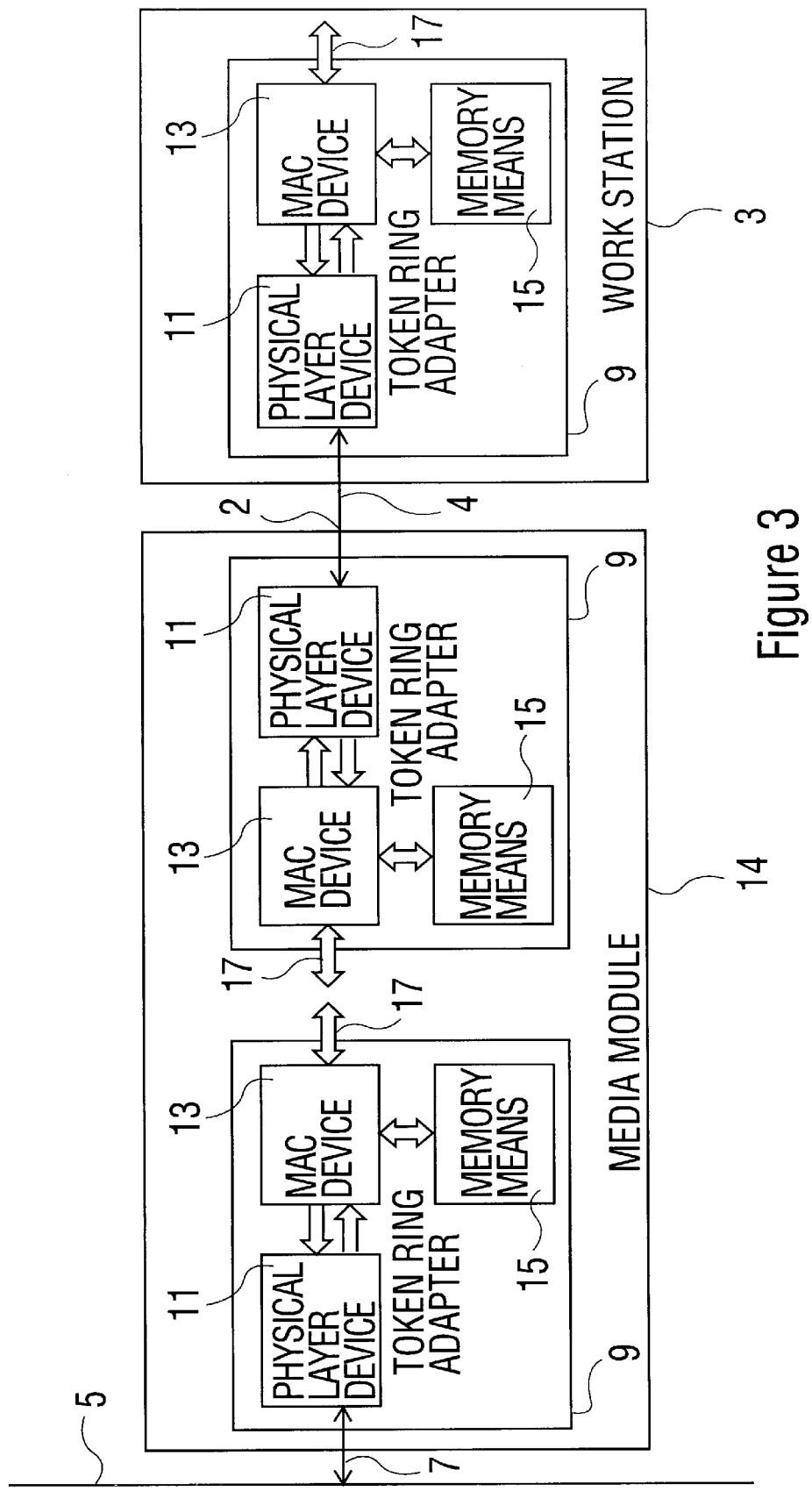
FIG. 3 is a schematic diagram of the token ring adapters inside the workstations and the media module.

As shown in FIG. 3, each work station also has a token ring adapter 9 for connecting to the cabling 4. Each token ring adapter 9 has a physical layer device 11 and a data link or MAC device 13. The MAC device 13 often interfaces with a memory means 15. As can be seen, token ring adapters can either interface to a cabling 4 or to a backplane 5.

When a work station 3 desires to transmit data, high level devices inside the workstation 3 prepare the data and place the data on the system bus 17 to the MAC device 13. The MAC device 13 processes the data in the known manner and sends it to the physical layer device 11. The physical layer device 11 processes the data in the known manner and sends the data over cabling 4 to the token ring adapter in the media module 14. Here the physical layer device 11 receives the data and processes it in the manner which is substantially the opposite the way the physical layer device 11 in the work station processed the data. Correspondingly, the MAC device 13 reverse processes the data and places it on the system bus 17 of the media module 14. Here the media module can process the data according to a preset configuration. Some of the processing is coordinating the data from other work stations 3 connected to the same media module and coordinating where the data is to go if the media module 14 is a port switch module. Once the data has been processed accordingly, it is placed onto the system bus 17 of the token ring adapter 9 which is adjacent the backplane 5. The data is then processed in the known manner to place it onto the backplane 5. When data comes from the backplane 5 and is destined for a work station 3, the processing is substantially reversed.

Many of the functions of the physical layer device 11 and the MAC device 13 are interrelated and therefore manufacturers usually form the physical layer device and the MAC device as a chip set pair, where each device is specifically designed to operate with its corresponding device. In the present invention, the token ring adapter 9 adjacent the backplane 5 uses a MAC device 13 from Texas Instruments and known as the Texas Instruments TMS380C16 Token Ring Communication processor. This Texas Instruments MAC device (TMS 380C16) is part of a chip set including a Texas Instruments physical layer device which is known as the Texas Instruments TMS38054 Ring Interface Device, and also available from Texas Instruments. Data sheets for the TI TMS380C16 device are enclosed in appendix B and are of public knowledge.

In the present invention, the token ring adapter adjacent the backplane does not use the Texas Instruments physical layer device, but instead uses a physical layer device manufactured by IBM and known as the IBM TRUMP 2.1 (Token Ring UTP Media PHY). The IBM TRUMP chip therefore replaces the TI TMS 38054 device.

Because the physical layer devices from both TI and IBM perform many of the same functions and deal with many of the same signals, many of the signals or leads from the IBM TRUMP chip can be directly connected to the TI MAC device and the surrounding circuitry of the token ring adapter in the known manner. A schematic diagram showing the TI MAC device and the names of the signals or leads on the TI MAC device is included in the drawings. The problem arises with regard to the REDY signal which the TI MAC device is supposed to receive from TI physical layer device. The TI physical layer device contains an energy detect circuit which coordinates the data transfer between the TI physical layer device and the TI MAC device. The physical layer device must synchronize with the data on the backplane and while it is synchronizing with the data, any data that is received can not be considered valid. The TI MAC device can either indicate for the physical layer device to synchronize with the data on the backplane or the physical layer device can start synchronization by itself if it finds that it has fallen out of synchronization. Frequency acquisition is another term for synchronization and is where the term FRAQ comes from. When the TI MAC desires synchronization or frequency acquisition, the state of the FRAQ signal is changed. When the IBM TRUMP device is in the process of resynchronizing, the FRAQ2 signal is active. According to TI MAC normal operation the REDY signal should be active when data is valid and inactive when data is not valid. The preset invention provides an interface means for analyzing the FRAQ and FRAQ2 signals and only activating the REDY signal when there has been no transition of the FRAQ signal for a clock period or the FRAQ2 signal is not active.

The signals of the TI MAC device which are involved with the energy detection circuit and the timing are as follows:

TI MAC to Phy Interface Signals (partial listing)

| | |
|---|---|
| DRIVER SIGNALS | These signals originate in the TMS380C16 MAC device and are sent to the TMS38054 device for transmit to the output cable. |
| FRAQ | Frequency acquisition control. This signal originates in the TMS380C16 MAC device and is used to determine the use of frequency or phase acquisition mode in the TMS38054. |
| NSRT | This signal originates in the TMS380C16 MAC device and is used to tell the TMS38054 to insert onto the ring medium. |
| RCLK | This signal originates in the TMS38054 device and is the recovered receive clock from the Token Ring data. This is sent to the TMS380C16 MAC. |
| RCVR | This signal originates in the TMS38054 device and is the recovered data from the Token Ring medium. This is sent to the TMS380C16 MAC. |
| REDY | This signal originates in the TMS38054 device. This signal provides an indication that sufficient time has elapsed since the last transition of FRAQ for the PLL to achieve lock as monitored by the energy detect capacitor. |
| WRAP | This signal originates in the TMS380C16 device and is used by the TMS38054 as an internal-wrap mode control. This allows the TMS38054 to be placed in the loopback wrap mode for adapter self test. |
| WFLT | This signal originates in the TMS38054 device and is used to inform the TMS380C16 of a Phantom-wire-fault. This signal detects the presence of a short circuit or open on the output terminals of the TMS38054. |

Figure 5:
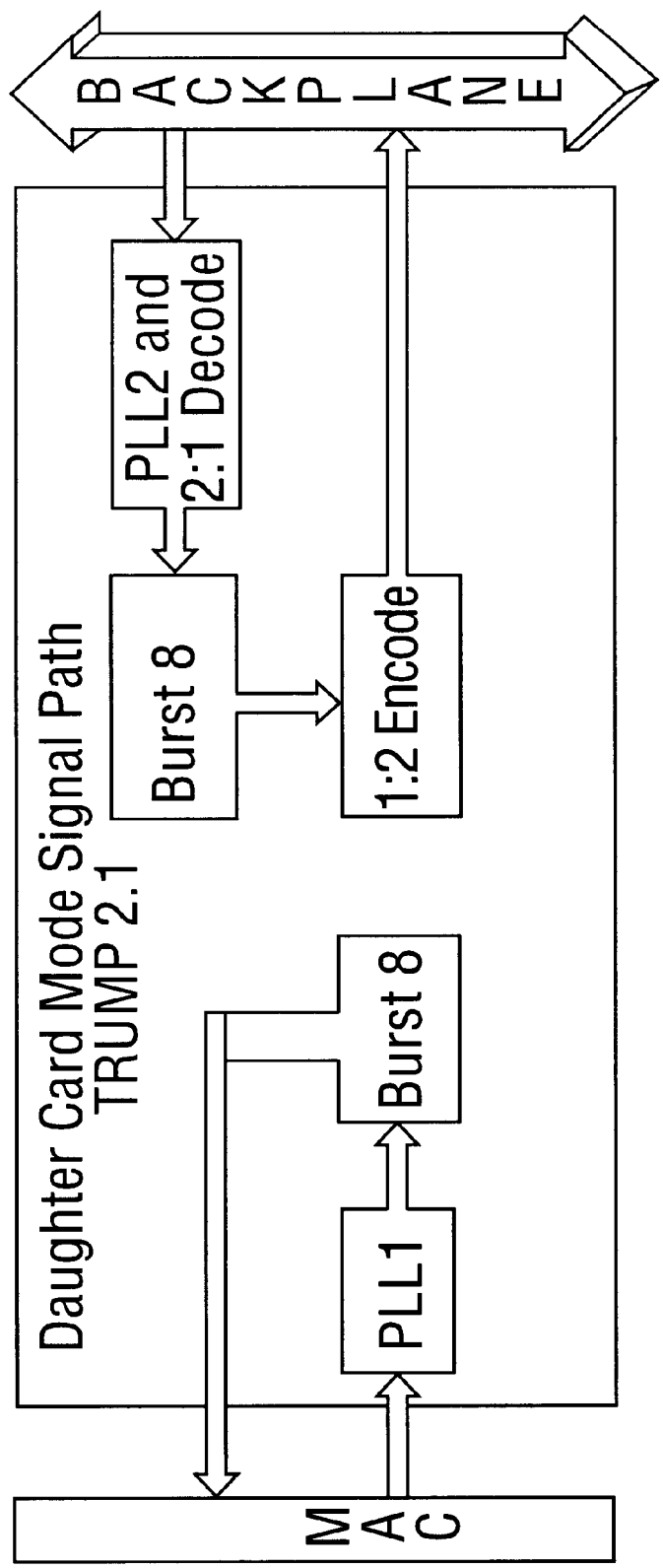
FIG. 5 is a schematic diagram of the IBM TRUMP Device in the daughter card mode.
Figure 6:
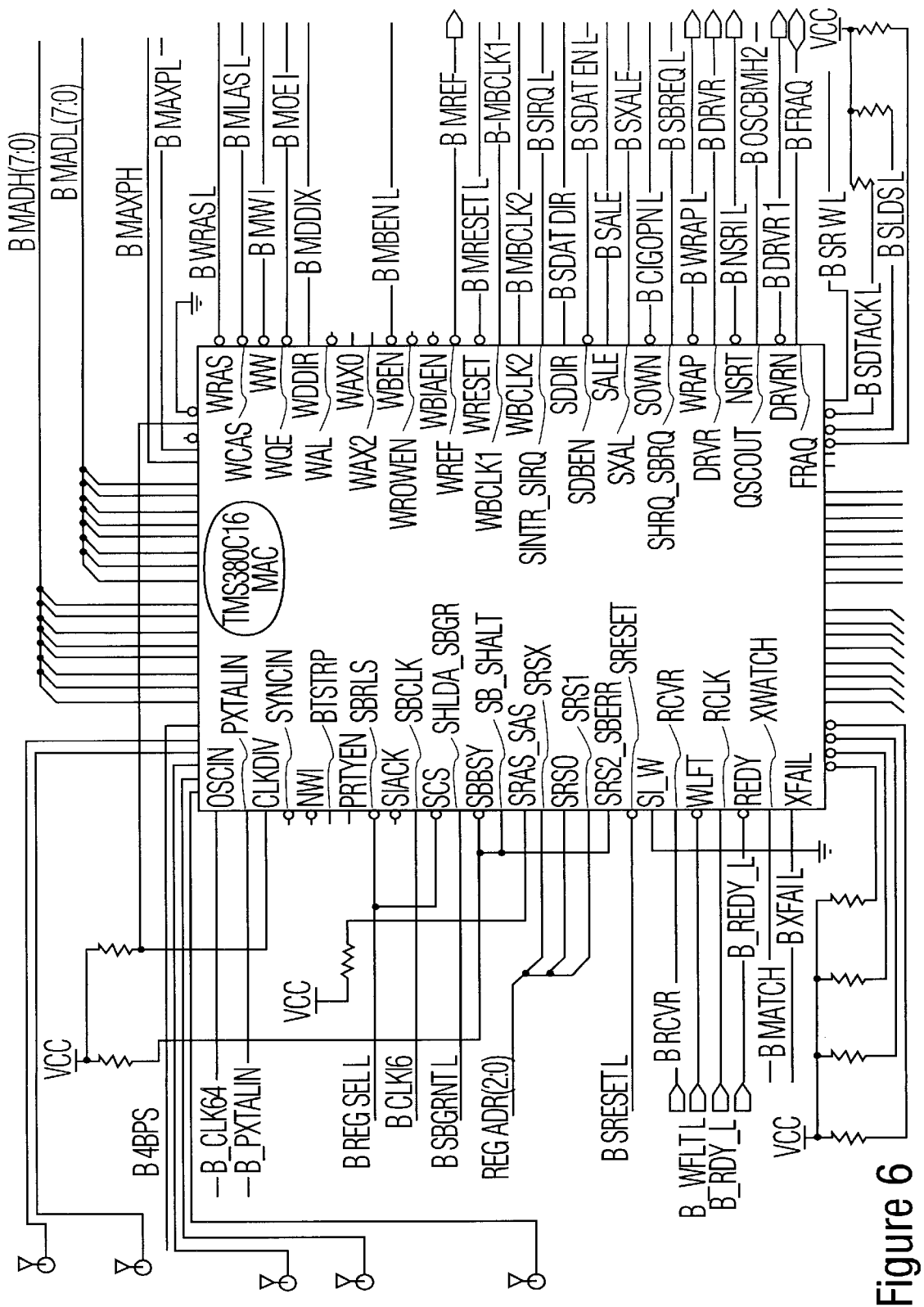
FIG. 6 is a schematic wiring diagram of the TI MAC Device in the circuitry of a token ring adapter.
Figure 7:
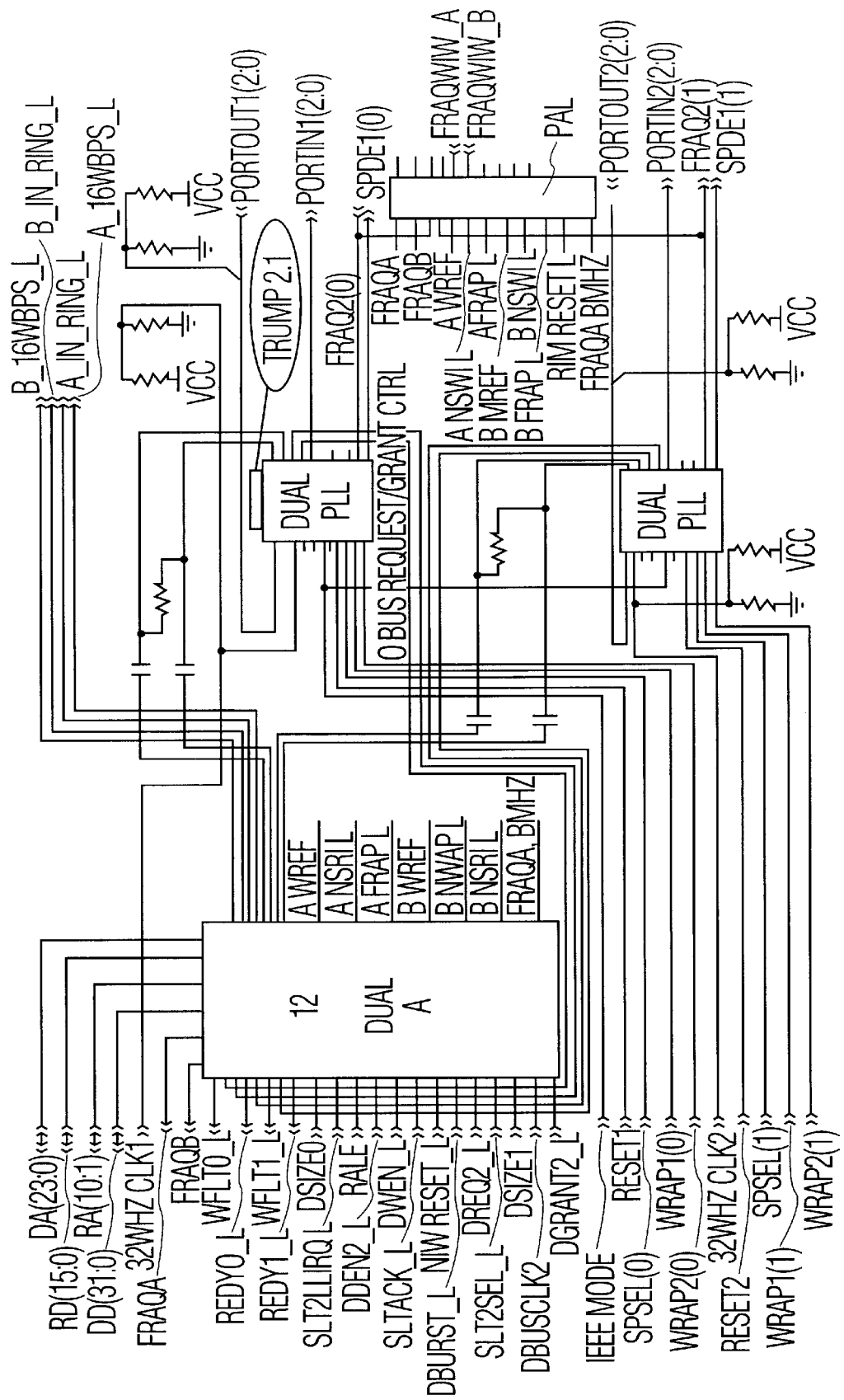
FIG. 7 is a schematic wiring diagram of the connections between the PAL Device and the IBM Physical Layer Device.
Figure 8:
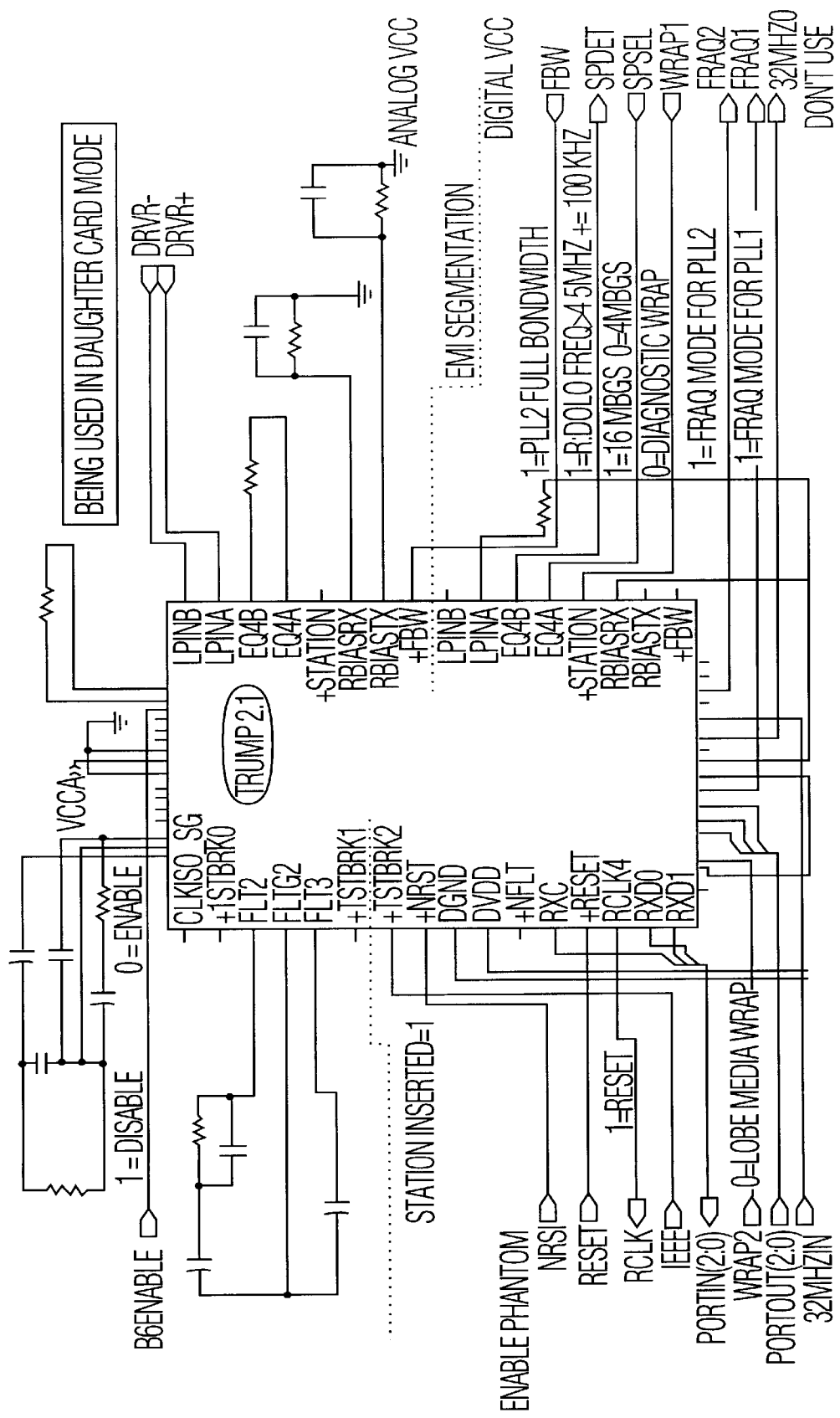
FIG. 8 is a schematic wiring diagram showing the connection of the IBM Physical Layer Device and its connections in the daughter card mode with portions of the token ring adapter.

The IBM TRUMP chip is operatable in many different modes and in the present invention the IBM TRUMP chip is operated in the Daughter Card mode as shown in FIG. 5. The IBM TRUMP chip contains an elastic store buffer to perform many of the same functions as the energy detection circuit which would be present in the TI physical layer device, but in a slightly different form. The signals of the IBM TRUMP chip that relate to the Elastic Store Buffer, the data transfer and the timing are as follows.

IBM MAC to Phy Interface Signals (partial listing)

| | |
|---|---|
| WRAP2 | This signal originates in the MAC and commands the TRUMP 2.1 to wrap the ring interface and also wraps the backplane interface. |
| WRAP1 | This signal originates in the MAC and commands the TRUMP 2.1 to wrap the transmit data to the receive data. |
| FRAQ1 | Frequency acquisition control. This signal originates in the TRUMP 2.1 and indicates the FRAQ mode of Phase Lock Loop1 (PLL1). |
| FRAQ2 | Frequency acquisition control. This signal originates in the TRUMP 2.1 and indicates the FRAQ mode of Phase Lock Loop2 (PLL2). |
| NSRT | This signal originates in the MAC device and is used to activate the phantom drive and wire fault circuits. |
| RXC | This signal originates in the TRUMP 2.1 device and is the recovered receive clock from PLL1. This is sent to the MAC. |
| RXD0.1 | These signals originate in the TRUMP 2.1 device and represent the recovered data from the Token Ring medium. These are sent to the MAC. |
| WFLT | This signal originates in the TRUMP 2.1 device and is used to inform the MAC of a Phantom-wire-fault. This signal detects the presence of a short circuit or open on the output terminals of the TMS38054. |
| DCMODE | This signal selects the mode of operation for the TRUMP 2.1. For this design the signal is configured to operate in Daughter Card Mode. |

Figure 4:
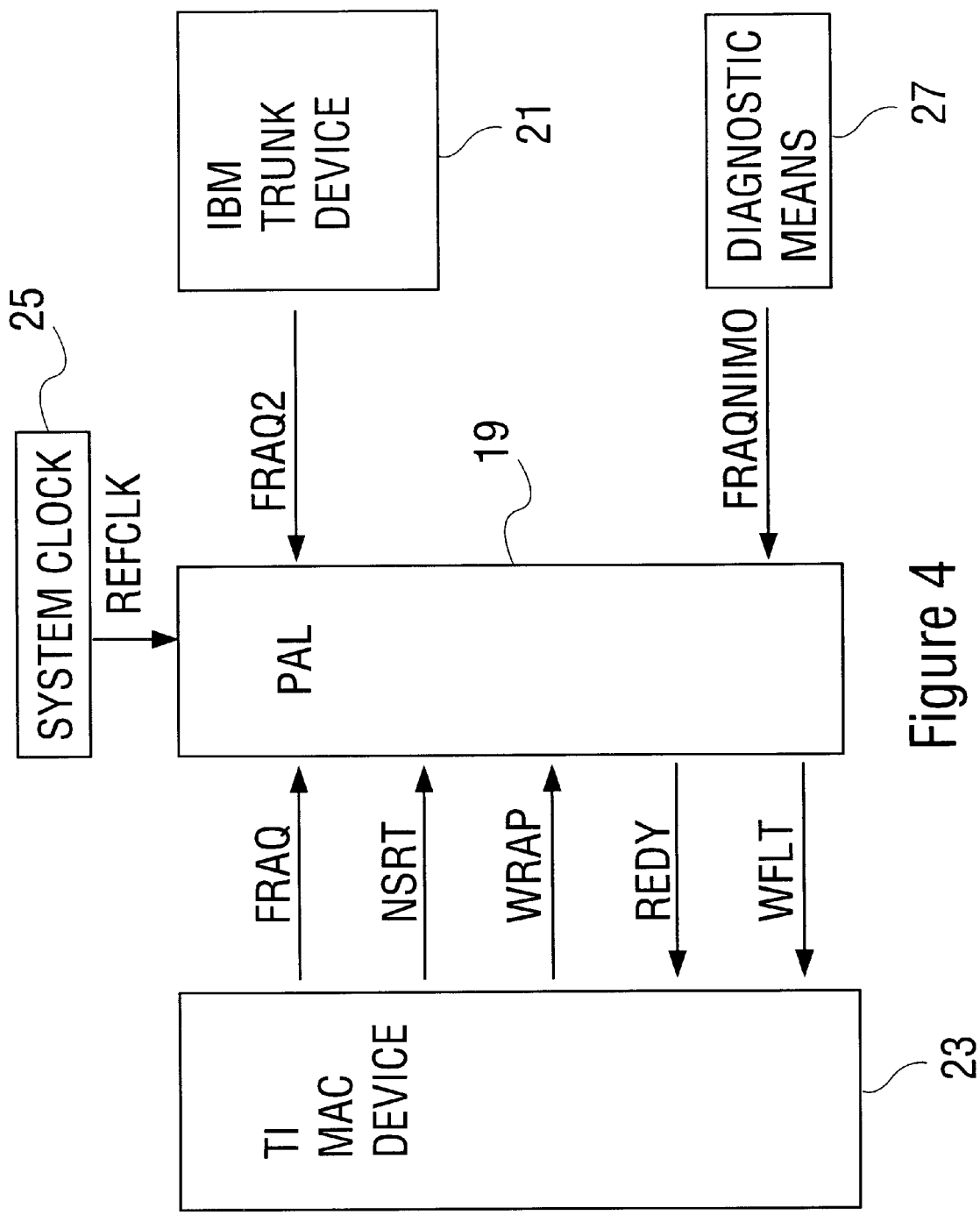
FIG. 4 is a schematic diagram of the connections between the TI MAC Device and the IBM TRUMP Device.

The present invention preferably uses a Programmable Array Logic (PAL) device 19 as the interface means. The PAL device 19, as shown in FIG. 4, receives the FRAQ 2 signal from the IBM TRUMP device 21. The PAL device 19 also receives the FRAQ, NSRT and the WRAP signals from the TI MAC device 23. The PAL 19 also receives the signal REFCLK from the system clock 25. The system clock 25 is the clock which controls the digital operation of the token ring adapter 9, and/or the entire media module 14. The PAL device 19 logically combines all the input signals to generate an output REDY signal which is connected to the REDY signal of the TI MAC device 23. The PAL device 19 also generates a WFLT signal which is also connected to the WFLT signal of the TI MAC device 23. The WFLT output signal of the PAL 19 is tied high by the PAL to indicate that there is no wire fault to the TI MAC device 23.

The calculation of the output REDY signal is as follows and is shown in the equations portion of the PAL program below. First a FRAQL signal is created in the PAL 19. The FRAQL signal is a latched version of the FRAQ signal. The FRAQ signal is latched with the signal clock to form the FRAQL signal. The REFCLK signal is a sequence of pulses. When a pulse occurs, the FRAQL signal is set equal to the FRAQ signal at the time of the pulse. The FRAQL signal is maintained at this level even after the pulse has passed and even if the original FRAQ signal has changed its level or value. The FRAQL signal maintains its value until the next pulse at which time it is again set equal to the value of the FRAQ signal at that time.

Another intermediate signal called, TRANS, is formed in the PAL 19. The TRANS signal is active when FRAQL is not equal to FRAQ. When the TRANS signal is active, it is an indication that the FRAQ signal has changed state. An inactive REDY signal is then generated if either the TRANS signal or the FRAQ2 signal is active.

The medium module also contains a diagnostic means 27 which generates a FRAQNIM which is connected to one of the input signals of the PAL 19. An inactive FRAQNIM signal indicates when the medium module 14 is undergoing diagnostic tests. The PAL 19 receives the FRAQNIM signal and uses the FRAQNIM signal to control whether or not to use the FRAQ output of the IBM TRUMP chip for MAC operation. The FRAQNIM signal is set to enable when attached to a backplane ring, otherwise it is said to disable so that the TI MAC passes Lobe M tests.

In particular the FRAQNIM signal is used by a control processor of the network to enable/disable a feedback path to the TI MAC. When the adapter is not connected to the network it is desirable in some self test situations, such as Lobe Media tests, to "fool" the TI MAC device into a Loop Back Mode. This is done by holding the REDY signal in the active state (ready state). Thus, when the adapter is not connected, FRAQNIM is inactive (not enabled) forcing a constant REDY=TRUE indication to the TI MAC. The TI MAC sees signals during the Lobe Media tests indicating that the TI MAC is connected to a valid TI physical layer device and therefore will pass the Lobe Media test if all else is correct. When the adapter is connected to a backplane, FRAQNIM is set active and the REDY signal is toggled appropriately.

Because of the design of the TI MAC device, the IBM TRUMP device and the PAL device, it is preferred in the present invention to combine two TI MAC devices with two IBM TRUMP devices and one PAL. The separate TI MAC devices can be labelled as A and B, and the separate IBM TRUMP devices can be labelled as 0 and 1. The enclosed schematic diagrams and programming description of the PAL 19 add the indicia A, B, 0 and 1 to the signals to indicate which respective device they refer to.

An example of a software program to configure the PAL Device to perform the above operations is as follows:

```
MODULE FRAQ flag '-r3'
TITLE 'Fraq Control PAL - Margarita 4TR
Rich Gazda Copyright 1995, Chipcom Corp.'
" 1/12/95    Rich Gazda Created
" 9/17/95    Modified Test
fraq_T DEVICE 'P22V10C';
"Inputs
FRAQA   PIN 3 ISTYPE 'reg';   "Fraq from TI MAC (Cisco)
FRAQB   pin 4 ISTYPE 'reg';   "Fraq from TI MAC (Cisco)
"
"This output determines the use of frequency or phase acquisition
"mode in the TMS38054.
"  High = Wide Range; Freq centering to PXTALIN by TMS38054
"  Lo  = Narrow Range, Phase-lock onto incoming data (RCVINA and
        RCVINB) of TMS38054
"
FRAQ2_0  pin 5;   "Fraq from TRUMP - HI = FRAQ MODE
FRAQ2_1  pin 6;   "Fraq from TRUMP - HI = FRAQ MODE
A_MREF   pin 7;   "MREF From TI MAC (Cisco)
B_MREF   pin 11;  "MREF from TI MAC (Cisco)
"
"This output represents the DRAM Refresh cycle in Progress. This
"signal may also be used for disabling MCAS to all DRAMs that do not
"use CAS before-RAS refresh
"  High = DRAM refresh cycle in process
"  Low  = Not a DRAM refresh cycle
!A_NSRT  pin 9;   "Insert control signal output from TI MAC
!B_NSRT  pin 12;  "Insert control signal output from TI MAC
"
"This TTL output signal enables the phantom driver outputs (PHOUTA
"and PHOUTB) of the TMS38054, through the watchdog timer, for
 insertion onto the TR.
"  Static High = Inactive, phantom current removed (due to wdog)
"  Static Low  = Inactive, phantom current removed (due to wdog)
"  NSRT Low and Pulsed High = Active, current on PHOUTA and
   PHOUTB
!A_WRAP  pin 10;  "Wrap Select TI MAC (Cisco)
!B_WRAP  pin 13;  "Wrap Select TI MAC (Cisco)
"
"This signal is an output from the TMS380C16(26) to the ring interface to
"activate an internal attenuated feedback path from the transmitted data
"(DRVR) to receive data (RCVR) signals for bring-up diagnostic testing.
"When active, the TMS38054 also cuts off the current to the transmission
 pair.
"  High = Normal ring operation
"  Low  = Transmit data drives receive data (loopback)
FRAQNIM0_EN  pin 23;   "Enable Fraq mode in pal
FRAQNIM1_EN  pin 21;   "Enable Fraq mode in pal
"
"This signal is an output from the CSR ASIC and controls whether
"or not to use the FRAQ output of the TRUMP for TMS380 operation.
"It is set to enable when attached to a backplane ring, otherwise
"it is set to disable so that the TMS380 passes lobe media tests:
"  High = Fraq Mode Enabled in PAL
"  Low  = Fraq Mode Disabled in PAL
NIM_RESET_L pin 16;   "Reset Signal from Cisco
REFCLK  pin 2;    "Reference Clock for Equations
VCC     pin 28;
"OutPuts
FRAQAL   pin 17 istype 'reg';
FRAQBL   pin 18 istype 'reg';
TRANS_A  pin 19 istype 'reg';
TRANS_B  pin 20 istype 'reg';
!REDY0   pin 27;  "Ring Interface Ready to TI MAC (Cisco)
!REDY1   pin 26;  "Ring Interface Ready to TI MAC (Cisco)
"
"This input pin provides an indication of the presence of received data, as
"monitored by the TMS38054 energy detect capacitor
"  High = Not ready, Ignore received data
"  Low  = Ready, received data
!WFLT0   pin 25;  "Wire Fault detect to TI MAC
!WFLT1   pin 24;  "Wire fault detect to TI MAC
"
"This signal input indicates a current imbalance of the TMS38054
"PHOUTA and PHOUTB pins.
"  High = No Wire fault detected
"  Low  = Wire fault detected
```

-continued

```
x = .X.;
X = .X.;
c = .C.;
equations
FRAQAL.clk = REFCLK; "Clock the register using MREF input
FRAQBL.clk = REFCLK; "Clock the register using MREF input
TRANS_A.clk = REFCLK;
TRANS_B.clk = REFCLK;
FRAQAL: = FRAQA;
FRAQBL: = FRAQB;
TRANS_A: = FRAQAL ! = FRAQA;
TRANS_B: = FRAQBL ! = FRAQB;
"Transition occurs when the latched input does not match the realtime
input
!REDY0 = TRANS_A # (FRAQ2_0 & FRAQNIMO_EN);
!REDY1 = TRANS_B # (FRAQ2_1 & FRAQNIM1_EN);
"Redy goes active when transition is detected for at least 1 clk and then
"goes Inactive
WFLT0 = 0; "Tied High to indicate no wire fault
WFLT1 = 0; "Tied High to indicate no wire fault
END FRAQ
```

While specific embodiments of the invention have been shown and described in detail to illustrate the application of the principles of the invention, it will be understood that the invention may be embodied otherwise without departing from such principles.

What is claimed is:

1. A token ring data processing device for a network comprising:

a physical layer device interfacing with a physical layer of the network, said physical layer device including an elastic store buffer for buffering data received from the physical layer, said physical layer device including a frequency acquisition 2 signal indicating when the data received from the physical layer is valid and invalid;

a MAC device receiving the buffered data from said physical layer device, said MAC device including a frequency acquisition signal which changes state when said physical layer device is to synchronize with the physical layer, said MAC device also including a ready signal for determining if the data from said physical layer device is valid;

interface means receiving said frequency acquisition 2 signal from said physical layer device and said frequency acquisition signal from said MAC device, said interface device generating a ready signal to said ready signal of said MAC device, said interface means generating an inactive ready signal when either of said frequency acquisition signal changes state or said frequency acquisition 2 signal indicates invalid data.

2. A token ring data processing device in accordance with claim 1, wherein:

a system clock generates a reference clock for equations signal for maintaining timing synchronization in the token ring adapter, said reference clock for equations signal including a sequence of pulses;

said interface means monitors said change of state of said frequency acquisition signal over one of clock cycle of said system clock.

3. A token ring data processing device in accordance with claim 2, wherein:

said MAC device is a Texas Instruments TMS380C16 Token Ring Communications processor;

said interface device is a programmable array logic (PAL) device having a plurality of input signals and a plurality of output signals, said frequency acquisition 2 signal of said physical layer device, and said frequency acquisition signal of said processor being connected to separate ones of said plurality of input signals of said PAL device, said ready signal of said processor being connected to one of said outputs of said PAL device, said PAL device including logic means for logically combining said input signals to form said outputs signals, said logic means forming a frequency acquisition L signal equal to said frequency acquisition signal at a time of one of said pulses of said reference clock for equations signal, said logic means maintaining said frequency acquisition L constant until a subsequent pulse of said reference clock for equations signal when it is again equalized to said frequency acquisition signal, said logic means forming a TRANS signal which is active when said frequency acquisition L signal is not equal to said frequency acquisition signal, said logic means forming an output ready signal which is connected to said ready signal of said processor, said output ready signal being inactive if one of said TRANS signal and said frequency acquisition 2 signal are active.

4. A token ring data processing device in accordance with claim 3, wherein:

said logic means sets said output ready signal as active when both said TRANS signal and said FRAQ2 signal are inactive.

5. A data processing device in accordance with claim 3, wherein:

said physical layer device is communicatable with a network backplane.

6. A token ring data processing device in accordance with claim 3, wherein:

said processor and said physical layer device form part of a Token Ring adapter.

7. A token ring data processing device in accordance with claim 6, wherein:

a media module includes said Token Ring adapter and said media module connects a plurality of workstations to a backplane.

8. A token ring data processing device in accordance with claim 7, wherein:

said Token Ring adapter connects said media module to said backplane.

9. A token ring data processing device in accordance with claim 8, wherein:

said MAC device includes a WFLT signal indicating a wire fault;

said logic means forming an output WFLT signal which is connected to said WFLT signal of said MAC device, said output WFLT signal being tied inactive.

10. A token ring data processing device in accordance with claim 8, wherein:

a concentrator includes said backplane and a plurality of said media modules.

11. A token ring data processing device in accordance with claim 7, wherein:

said media module includes diagnostic means for testing operation of said media module, said diagnostic means including a frequency acquisition NIM signal which indicates testing;

said PAL device includes a frequency acquisition NIM input signal connected to said frequency acquisition NIM signal of said diagnostic means, said PAL device disabling frequency acquisition mode during testing.

* * * * *